July 30, 1940.	2,209,807
BENJAMIN BELSKY, ALSO KNOWN AS BANEY BELSKY
DRIP PAN FOR DOUGH CUTTING MACHINES
Filed March 7, 1939

INVENTOR.
BENJAMIN BELSKY
BY M. P. Parish
ATTORNEY.

Patented July 30, 1940

2,209,807

UNITED STATES PATENT OFFICE 2,209,807

DRIP PAN FOR DOUGH CUTTING MACHINES

Benjamin Belsky, also known as Baney Belsky, New York, N. Y.

Application March 7, 1939, Serial No. 260,317

6 Claims. (Cl. 210—149)

This invention relates generally to portable dough pressing and cutting machines as used in the baker's art, and more particularly to a drip pan for use in connection with such a machine to collect edible oils or the like pressed from said dough by the machine and which oils drip through said machine to the area underlying the base thereof.

One object of the invention is to provide in a pan a removable oil receptacle drawer having a filter therein, the pan remaining in engagement with the base of the machine.

Another object is to provide a pan having a number of compartments in communication with each other which compartments may have screens thereover to screen out lumps of dough and solid matter and the like which may fall thereon and to otherwise safeguard said oil.

These and other advantages will be apparent from the following description and accompanying drawing forming part thereof.

It is known by those skilled in the baker's art that edible oils are combined with dough or placed thereon prior to pressing and cutting the dough so that the dough will not adhere to the press after having been pressed and cut into predetermined sized pieces in the dough pressing compartment of said machine. The oils act in part as a lubricant for the dough to prevent said adherence. Said oils have been heretofore largely wasted because they dripped onto the floor and were lost or as they dripped down through the machine into a base pan no provision was made for proper collection and subsequent convenient removal and cleansing thereof nor was there provision for keeping out of said pan oils, particles of solid matter such as dough or the like. Such oils flow mainly down a central shaft of the machine.

Figure 1:
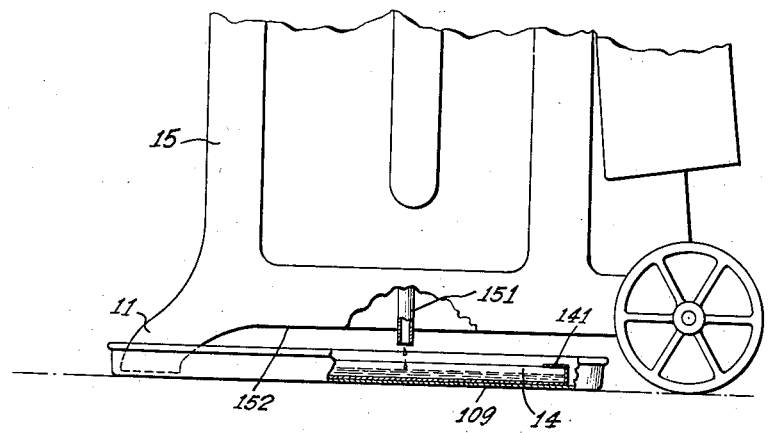
Fig. 1 represents a side elevation of the base of a dough pressing and cutting machine showing my drip pan in operative position with the two forward legs of the machine in the pan.
Figure 2:
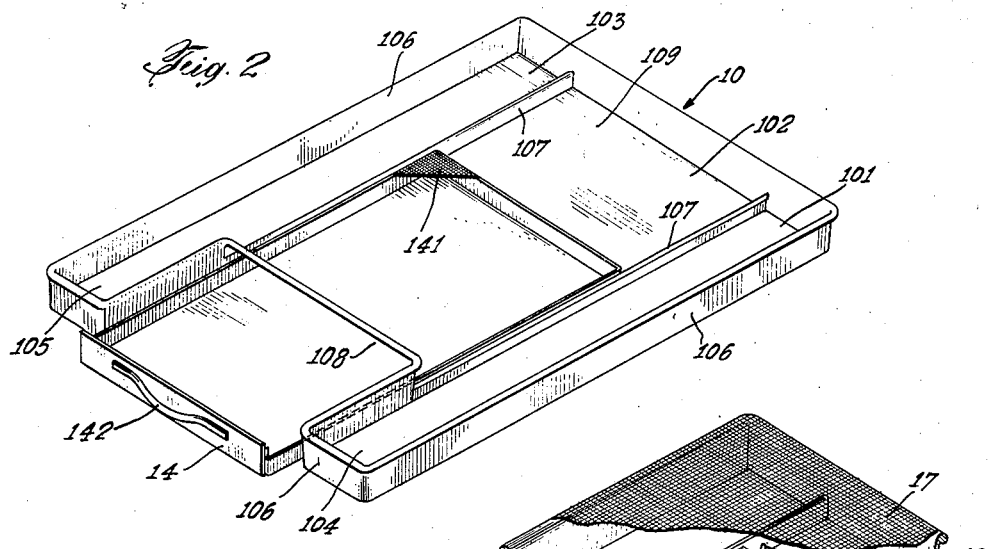
Fig. 2 is a perspective view looking into the top of my drip pan and drawer thereof.
Figure 3:
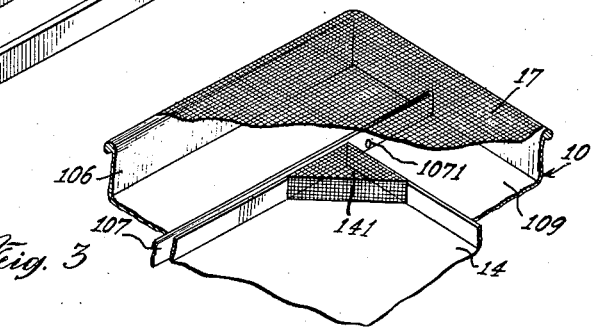
Fig. 3 is a fragmentary sectional view of my pan showing an embodiment providing a screen over the top of the pan.

In Fig. 2 is shown a perspective view of my drip pan 10, which may have compartments 101, 102, 103, and forward extensions 104 and 105, into which may be placed the forward legs 11 and 12 of the heavy metal dough press, 15, as shown in Fig. 1. The pan 10 has side walls 106 and may have intermediate walls 107, which may have passageways therein 1071, providing communicating compartments. In the forward side wall 106, an aperture 108 is provided for passage therethrough of suitable drawer 14. It is seen that the drawer may be contained within compartment 102 and may be guided in its movement therein by walls 107. The drawer may have a metal screen filter 141 as shown in Fig. 2, or said filter may be constructed as otherwise desired, in a corner of the drawer or other place therein. The drawer may have handle 142 attached thereto. The major portion of said edible oil is seen to drip directly into said drawer from said central shaft 151.

Any or all of the compartments may have wire mesh screens or screen 17, thereover to prevent entry of solid substances to the pan or drawer or parts of either thereof.

The height of the pan permits its being inserted beneath the base portion of the machine 152, so as to underlie the main portion of the machine and provides for easy sliding removal therefrom of the drawer.

It is seen that substantially all oils dripping from the machine will fall into said pan and be collected thereby.

Parts may be used without others. The disclosure is intended to be illustrative rather than limitative.

I claim:

1. In combination, a machine having legs, a tray having a bottom and outer edge walls and being adapted to receive two of said legs in the forward portion therein to rest on the bottom of the tray and hold it in fixed position under the machine; a passageway in one of said walls; a drawer removably slideable thru said passageway; said drawer and tray adapted to receive drip oil from said machine whereby removal of the drawer leaves the tray fixed to receive drip oil from the machine.

2. In combination, a machine having legs and a tray therefor having a bottom and integral outer edge walls, said tray being adapted to receive two of said legs in the forward portion thereof to thus hold the tray in fixed position under the machine, a passageway in one of said walls, a drawer removably slideable thru said passageway, said drawer and tray adapted to receive therein drip-oil from said machine, and a filter in said drawer to filter said oil as it is poured out of said drawer whereby removal of the drawer leaves the tray fixed to receive drip oil from the machine.

3. In combination, a machine having legs, and a tray having a bottom and integral outer edge walls, said tray being adapted to receive two of said legs in the forward portion thereof to thus hold the tray in fixed position under the machine, a passageway in one of said walls, a drawer removably slideable thru said passageway, two intermediate walls extending from the front to the back walls of said tray, to form an intermediate compartment for said drawer, an outer compartment on each side of the drawer compartment, said drawer and tray adapted to receive therein drip-oil from said machine, and a filter in said drawer to filter said oil as it is poured out of said drawer, said outer compartments adapted to receive matter which may drop therein from said machine whereby removal of the drawer leaves the tray fixed to receive drip oil from the machine.

4. The device of claim 3 characterized by the fact that the tray has an overlying screen for at least one of said compartments.

5. In combination, a machine having legs and a tray therefor having a bottom and integral outer edge walls, said tray being adapted to receive two of said legs in the forward portion thereof to thus hold the tray in fixed position under the machine, a passageway in one of said walls, a drawer removably slideable thru said passageway, said drawer and tray adapted to receive therein drip-oil from said machine, and a filter in said drawer to filter said oil as it is poured out of said drawer, and a handle for said drawer whereby removal of the drawer leaves the tray fixed to receive drip oil from the machine.

6. In combination, a portable machine having two forward legs and rear turnable means to facilitate wheeling movement and tilting of the machine, a tray having a bottom and outer edge walls and being adapted to receive said legs in the forward portion therein to rest on the bottom of the tray and hold it in fixed position under the machine, a passageway in one of said walls, a drawer removable from said tray and slideable thru said passageway, said drawer and tray adapted to separately receive drip oil from said machine, whereby the machine may be moved independent of the tray and the tray may be removably fixed under the legs when the machine is tilted, and removal of the drawer leaves the tray fixed to alone receive drip oil from the machine.

BANEY BELSKY.